US008615016B2

(12) United States Patent  (10) Patent No.: US 8,615,016 B2
Gopalakrishnan et al.  (45) Date of Patent: Dec. 24, 2013

(54) METHOD AND SYSTEM FOR MANAGING MULTIMEDIA MESSAGES USING A MESSAGE INTERMEDIATION MODULE (75) Inventors: Kumar Gopalakrishnan, Mountain View, CA (US); Ramkumar Venketaramani, Sunnyvale, CA (US)

(73) Assignee: Unwired Planet, LLC, Reno, NV (US)

( * ) Notice: Subject to any disclaimer, the term of this patent is extended or adjusted under 35 U.S.C. 154(b) by 235 days.

(21) Appl. No.: 12/895,560

(22) Filed: Sep. 30, 2010

(65) Prior Publication Data

US 2011/0075676 A1  Mar. 31, 2011

Related U.S. Application Data (60) Provisional application No. 61/247,532, filed on Sep. 30, 2009.

(51) Int. Cl.
 *H04L 12/28* (2006.01)
(52) U.S. Cl.
 USPC ........................................................ 370/401
(58) Field of Classification Search
 USPC ............................ 370/315; 709/207, 242, 227
 See application file for complete search history.

(56) References Cited

U.S. PATENT DOCUMENTS

| | | | |
|---|---|---|---|
| 6,600,732 B1 | 7/2003 | Sevanto et al. | |
| 7,154,901 B2 | 12/2006 | Chava et al. | |
| 7,430,284 B2 | 9/2008 | Dudley et al. | |
| 2004/0103157 A1* | 5/2004 | Requena et al. | 709/206 |
| 2004/0196858 A1 | 10/2004 | Tsai et al. | |
| 2005/0235048 A1* | 10/2005 | Costa-Requena et al. | 709/219 |
| 2006/0031369 A1* | 2/2006 | Caron et al. | 709/207 |
| 2006/0224525 A1 | 10/2006 | Dahlin et al. | |
| 2008/0114850 A1* | 5/2008 | Skog et al. | 709/207 |
| 2008/0276003 A1* | 11/2008 | Dudley et al. | 709/242 |
| 2008/0293386 A1 | 11/2008 | Noldus | |
| 2009/0049559 A1* | 2/2009 | Mostafa | 726/29 |
| 2009/0234927 A1 | 9/2009 | Buzescu | |

\* cited by examiner

*Primary Examiner* — Chi Pham
*Assistant Examiner* — Fahmida Chowdhury (57) ABSTRACT

A system and method for managing multimedia messaging is described. A system includes a messaging intermediation module having, a sender-side interface configured to communicate a multimedia message between the messaging intermediation module and a data gateway of a multimedia messaging system, a recipient-side interface configured to communicate the multimedia message between the messaging intermediation module, an Internet gateway, a message store and forward (MSF) server, and another messaging intermediation module, a message storage module configured to store the multimedia message for forwarding to the Internet gateway, the MSF server, and the other messaging intermediation module, and a workflow engine configured to process the multimedia message. In response to the processing, the workflow engine forwards the multimedia message to the Internet gateway, forwards the multimedia message to the MSF server, or forwards the multimedia message to the other messaging intermediation module. Other embodiments are also described.

23 Claims, 5 Drawing Sheets

METHOD AND SYSTEM FOR MANAGING MULTIMEDIA MESSAGES USING A MESSAGE INTERMEDIATION MODULE

CROSS-REFERENCE TO RELATED APPLICATION

This application is entitled to the benefit of provisional U.S. Patent Application Ser. No. 61/247,532, filed Sep. 30, 2009.

BACKGROUND

Store and forward communications systems for delivery of multimedia messages (e.g., messages that include audio, video, and/or image data) have been developed as part of 3G wireless network services. Multimedia Messaging Service (MMS), which is widely available on 3G wireless networks, enables users of mobile stations to send and receive multimedia messages that may include audio, video, image, or text data. In conventional multimedia messaging systems, the communication of multimedia messages involves a sender generating a multimedia message on a mobile station, the transmission of the multimedia message to a message store and forward (MSF) server in the wireless service provider network, the sending of a notification message to a recipient mobile station, the retrieval of the multimedia message by the recipient mobile station in response to the notification message, and the consumption of the multimedia message (e.g., viewing, listening, reading, etc.) on the recipient mobile station. As the size of individual multimedia messages and the number of such multimedia messages sent by users of wireless networks increases, conventional multimedia messaging systems that rely entirely on an MSF server can become overwhelmed, which can limit the scalability of such multimedia messaging systems.

SUMMARY

Embodiments of a system are described. In one embodiment, a system for managing multimedia messaging is described. The system includes a messaging intermediation module having a sender-side interface configured to communicate a multimedia message between the messaging intermediation module and a data gateway of a multimedia messaging system, a recipient-side interface configured to communicate the multimedia message between the messaging intermediation module, an Internet gateway, an MSF server, and another messaging intermediation module, a message storage module configured to store the multimedia message for forwarding to the Internet gateway, the MSF server, and the other messaging intermediation module, and a workflow engine configured to process the multimedia message. In response to the processing, the workflow engine forwards the multimedia message to the Internet gateway, forwards the multimedia message to the MSF server, or forwards the multimedia message to the other messaging intermediation module. Other embodiments of a system are also described.

Embodiments of a method are also described. In one embodiment, a method for managing multimedia messaging is described. The method for managing multimedia messaging involves receiving a multimedia message at a messaging intermediation module from a data gateway, processing the multimedia message at the messaging intermediation module to select where the multimedia message is to be forwarded, wherein the selection is made from an Internet gateway, an MSF server, or another messaging intermediation module, and forwarding the multimedia message from the messaging intermediation module to the selected one of the Internet gateway, the MSF server, or the other messaging intermediation module. Other embodiments of a method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
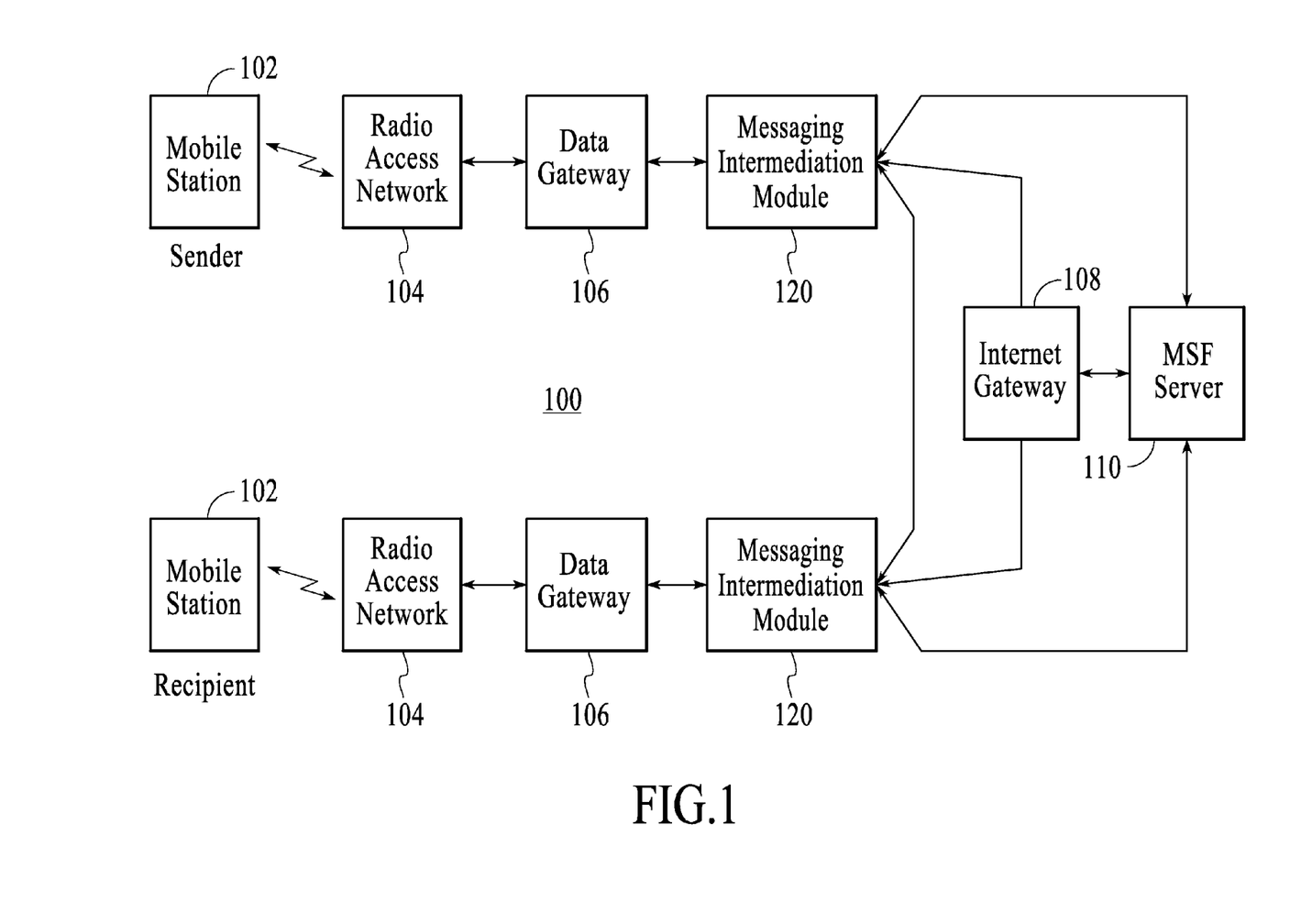
FIG. 1 depicts a schematic block diagram of one embodiment of a multimedia messaging system for communicating multimedia messages between mobile stations.

FIG. 1 depicts a schematic block diagram of one embodiment of a multimedia messaging system 100 for communicating multimedia messages between mobile stations 102, where the multimedia messages include at least one of audio, video, or image data. The multimedia messaging system depicted in FIG. 1 includes mobile stations, radio access networks 104, data gateways 106, an Internet gateway 108, a message store and forward (MSF) server 110, and messaging intermediation modules 120. Although the multimedia messaging system is depicted and described with certain components and functionality, other embodiments of the multimedia messaging system may include fewer or more components to implement less or more functionality.

For description purposes, one of the mobile stations 102 sends a multimedia message and one of the mobile stations receives the multimedia message. Accordingly, the mobile station, radio access network 104, data gateway 106, and messaging intermediation module 120 on the sender side of the multimedia messaging system 100 are referred to herein as the "sender-side" mobile station, radio access network, data gateway, and messaging intermediation module, respectively, and the mobile station, radio access network, data gateway, and messaging intermediation module on the recipient side of the multimedia messaging system are referred to herein as the "recipient-side" mobile station, radio access network, data gateway, and messaging intermediation module, respectively.

The mobile stations 102 are typically handheld wireless devices, such as cell phones, mobile phones, smartphones, Personal Digital Assistants (PDA), handheld gaming devices etc, that can wirelessly communicate using radio frequency (RF) communications signals. The mobile stations can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies. Although some wireless communications protocols are identified herein, it should be understood that present disclosure is not limited to the cited wireless communications protocols.

In the embodiment of FIG. 1, the radio access networks 104 facilitate radio communications between the mobile stations 102 and a core network that includes the data gateways 106, the Internet gateways 108, the MSF server 110, and the messaging intermediation modules 120. In an embodiment, the radio access networks include one or more base stations to facilitate communications among the mobile stations that are within a communication range of the base stations. Each base station has at least one RF transceiver and the base stations communicate with the mobile stations using RF communication signals. The radio access network facilitates network communications among multiple mobile stations within the same radio access network and between mobile stations in other radio access networks and provides interfaces to facilitate communications with other entities, such as a Public Switched Telephone Network (PSTN), a Wide Area Network (WAN), the Internet, Internet servers, hosts, etc., which are outside of the radio access network. In an embodiment, the network elements depicted in FIG. 1 are part of a wireless network that is operated by a single wireless service provider.

Data signals communicated between the mobile stations 102 and the radio access networks 104 include, but are not limited to, analog and/or digital RF signals (i.e., radio waves) for any type of communication mode, including text messaging, multimedia messaging, voice calling, and Internet browsing. The radio access network can support various different RF communications protocols, including without limitation, GSM, UMTS, CDMA, WiMax and communications protocols as defined by 3GPP, 3GPP2, or IEEE 802.16. Although some wireless communications protocols are identified herein, it should be understood that present disclosure is not limited to the cited wireless communications protocols.

The data gateways 106 configure outgoing data access requests for use with one or more networks and configure incoming data for use by or display on a mobile station 102. As shown, each data gateway interfaces directly with a radio access network 104 and a messaging intermediation module 120, although other embodiments may include other intermediate functional elements. In one embodiment, the data gateways use GPRS Tunneling Protocol (GTP) to communicate with the radio access network. Other embodiments may use other communications protocols. Other conventional operations of the data gateways are known. For example, the data gateways enable users of mobile stations to roam between cells, for example, to move between different locations within the radio access network, by tracking the mobile station's identity across the network. The data gateway may also provide authentication and data formatting functions.

The Internet gateway 108 provides a gateway for communications between mobile stations 102 and Internet-connected hosts and/or servers. For example, the Internet gateway can be a Wireless Application Protocol (WAP) gateway that converts the WAP protocol used by the radio access network to the Hypertext Transfer Protocol (HTTP) protocol used by the Internet. In an embodiment, the Internet gateway enables mobile stations to access multimedia content, such as Hyper Text Markup Language (HTML), compact HTML (cHTML), and extensible HTML (xHTML), which is stored on Internet-connected hosts and/or servers.

The MSF server 110 facilitates multimedia messaging. In an embodiment, the MSF server, which may be, for example, a multimedia message service center (MMSC) in a Multimedia Messaging Service (MMS) environment, implements message store and forward functionality as is known in conventional multimedia messaging systems.

Although the multimedia messaging system 100 depicted in FIG. 1 includes two mobile stations 102, two radio access networks 104, two data gateways 106, two messaging intermediation modules 120, one MSF server 110, and one Internet gateway 108, it should be understood that the multimedia messaging system can include more than the depicted number of such elements. Additionally, the multimedia message system can support multiple mobile stations.

With reference to FIG. 1, in a message store and forward process, the sender-side mobile station 102 generates a multimedia message, identifies a recipient-side mobile station (e.g., by entering a telephone number), and initiates the sending of the multimedia message. The MSF server 110 receives the multimedia message from the sender-side mobile station and determines if the recipient-side mobile station is capable of receiving the multimedia message. If the recipient-side mobile station is capable of receiving the multimedia message, then the content of the multimedia message is extracted from the message and sent to a storage module within the MSF server, for example, with an Hyper Text Transfer Protocol (HTTP) front-end. The MSF may also process the content of the multimedia message. For example, the MSF may transcode, compress, and/or convert the content of the multimedia message. The MSF server also sends a notification to the recipient-side mobile station to notify the recipient-side mobile station that there is a multimedia message awaiting delivery. In an embodiment, the MSF server uses Open Mobile Alliance (OMA) Push or Short Message Service (SMS) Push to send the notification message to the recipient-side mobile station. For example, an SMS "control message" containing an embedded Uniform Resource Locator (URL) of the multimedia content is sent to the recipient-side mobile station as the notification message. Several other messages may be exchanged to indicate the status of the multimedia message. Once the recipient-side mobile station receives the notification, the recipient-side mobile station fetches the multimedia message at the location indicated in the notification message. The recipient-side mobile station may or may not alert the user of the notification and fetching the multimedia message may or may not require a user input to the mobile station. In an embodiment, upon a command from the recipient-side mobile station, the multimedia message is uploaded from the MSF server to the recipient-side data gateway, forwarded to the recipient-side radio access network, and then wirelessly transmitted to the recipient-side mobile station to complete the message store and forward process.

If the recipient-side mobile station 102 is not capable of receiving the multimedia message, then the multimedia message can be delivered to a web-based service from where the content of the multimedia message can be viewed using a personal computer based Internet browser. In an alternative embodiment, the URL for the content is sent to the recipient-side mobile station in a text message. This type of service is typically referred to as a legacy experience since the content of the multimedia message can still be received by the mobile station having the intended phone number, even if the recipient-side mobile station itself does not support multimedia messaging. Other embodiments of multimedia messaging systems may use other message store and forward protocols. Other conventional operations of the MSF server are known and, hence, are not described further herein.

In accordance with an embodiment of the invention, the messaging intermediation modules 120 are located in the multimedia messaging system between the data gateways 106 on one side and the Internet gateway 108 and the MSF server 110 on the other side. In particular, each messaging intermediation module is functionally located in a message path that is between the respective data gateway on one side and the Internet gateway and the MSF server on the other side. In accordance with an embodiment of the invention, the messaging intermediation module manages the flow of multimedia messages between sender and recipient mobile stations. In an embodiment, the sender-side messaging intermediation module intercepts multimedia messages that are sent from the sender-side mobile station and processes the multimedia messages to determine where to forward the multimedia messages. In addition to the forwarding decision, the messaging intermediation module may perform various other functions that help to improve the performance of the multimedia messaging system. For example, the messaging intermediation module may perform any of the following functions:

1) manage the communication of multimedia messages from the sender-side mobile station;
2) store multimedia messages for delayed delivery;
3) optimize the content of multimedia messages;
4) forward multimedia messages directly to the MSF without passing the multimedia message through the Internet gateway;
5) forward multimedia messages to other messaging intermediation modules without passing through the MSF server;
6) forward multimedia messages directly to recipient-side mobile stations without passing through the MSF server; and
7) managing the forwarding of a multimedia message to the data gateway on the recipient-side when the multimedia message is forwarded directly from a sender-side messaging intermediation module to the recipient-side mobile station without passing through the MSF server.

Because of their position in the multimedia messaging system 100, the messaging intermediation modules 120 can improve the performance of the multimedia messaging system by intelligently forwarding multimedia messages within the multimedia messaging system. Additional improvements in performance can be achieved by processing the multimedia messages to, for example, optimize the content of the multimedia messages and to provide value added services.

Each one of the messaging intermediation modules 120 can be a standalone network element, such a distinct network node (e.g., a different "box") that is connected to the network by wired and/or fiber-optic network connections using network communications protocols such as Internet Protocol and Ethernet. Alternatively, each one of the messaging intermediation modules may be integrated with one of the other network elements. For example, a messaging intermediation module may be located in the same "box" as one of the data gateways 106, the Internet gateway 108, or the MSF server 110. Whether the messaging intermediation module is physically located in a distinct physical network node or in the same network node as another network element, the functionality of the messaging intermediation module is basically the same.

Use of a messaging intermediation module as described herein is applicable to different kinds of radio access networks, including, for example, 3GPP, 3GPP2, IEEE 802.16, and 4G radio access networks. One example of the application of a messaging intermediation module is described below with regard to a 3GPP radio access network. In a 3GPP environment, multimedia messaging is referred to as the Multimedia Messaging Service (MMS), and multimedia messages are referred to as MMS messages.

Figure 2:
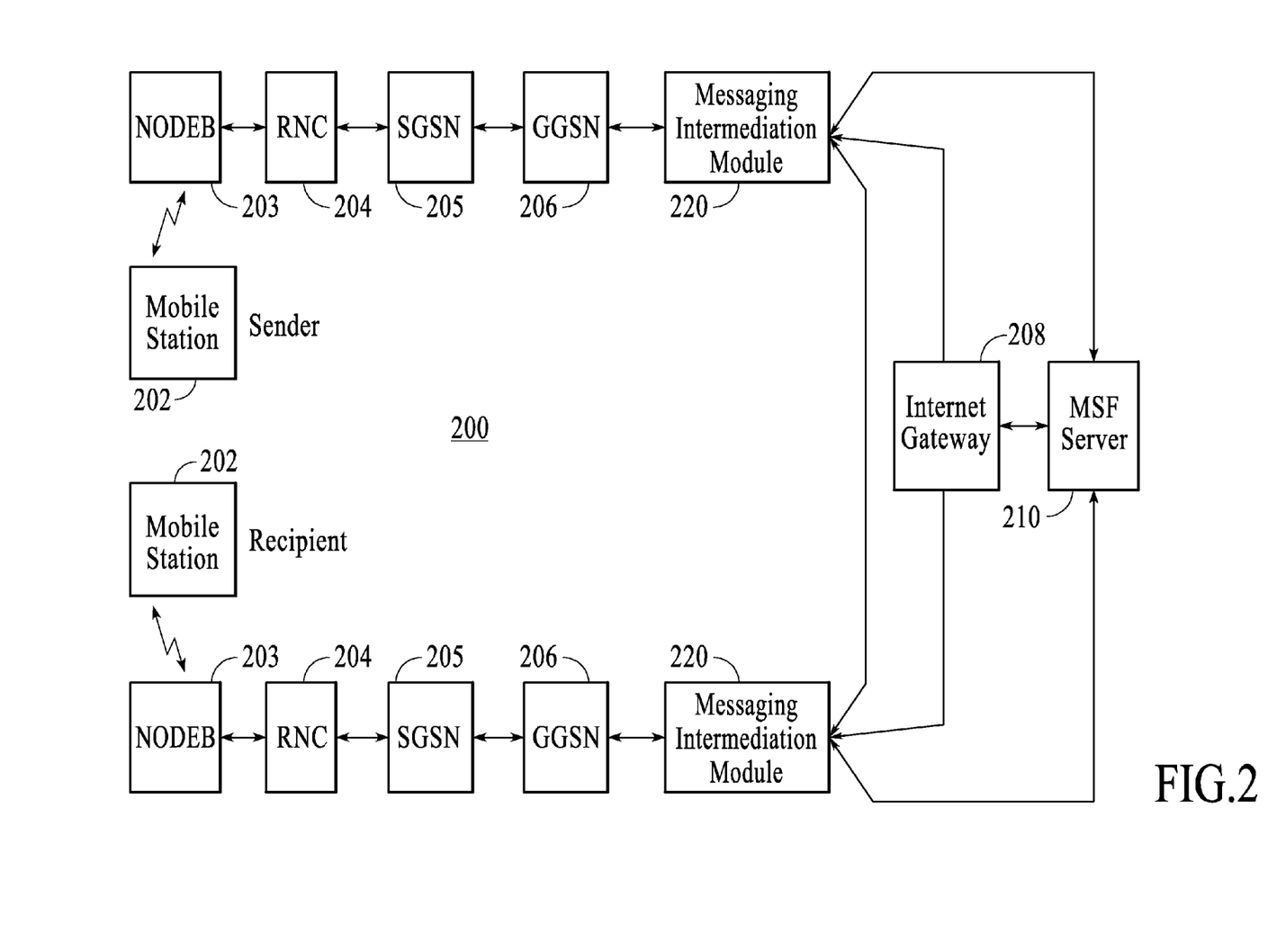
FIG. 2 depicts a Multimedia Messaging Service (MMS) system that includes radio access networks, messaging intermediation modules on both the sender and recipient sides and an Internet gateway and a Multimedia Messaging Service Center (MMSC).

FIG. 2 depicts an MMS system 200 that includes mobile stations 202, radio access networks, and messaging intermediation modules 220 on both the sender and recipient sides and an Internet gateway 208 and an MMSC 210. The radio access networks are defined by the 3GPP and each of the radio access networks includes a NodeB 203, a Radio Network Controller (RNC) 204, a Serving General Packet Radio Service (GPRS) Support Node (SGSN) 205, and a Gateway GPRS Support Node (GGSN) 206.

Each of the NodeBs 206 is a network element that performs base station functionality. In an embodiment, the NodeBs use Wideband Code Division Multiple Access (WCDMA)/Time Division Synchronous Code Division Multiple Access (TD-SCDMA) to communicate with the mobile stations. In an embodiment, each NodeB includes an RF transceiver that communicates with the mobile stations that are within a service area of the NodeB. In one embodiment, the NodeBs have a minimum amount of functionality and are controlled by an RNC. In another embodiment in which High Speed Downlink Packet Access (HSDPA) is used, some logic (e.g. retransmission) is handled by the NodeB to achieve shorter response times.

Each RNC 204 is a network element that is controls the connected NodeBs 204. In particular, the RNC is responsible for radio resource management and mobility management. The RNC is also the element that performs encryption before user data is sent to and from a mobile station. In an embodiment, radio resource management operations include outter loop power control, load control, admission control, packet scheduling, handover control, security functions, and mobility management. The Radio Network Controller may also various radio resource optimization operations.

Each SGSN 205 is a network element that delivers packets to and from the mobile stations 202 within a corresponding geographical service area. Functionality of the SGSN includes packet routing and transfer, mobility management (e.g., attach/detach and location management), logical link management, and authentication and billing. In an embodiment, the SGSN maintains a location register that stores location information, such as the current cell of a mobile station, and user profiles, such as International Mobile Subscriber Identity (IMSI) address used in the packet data network, of all GPRS mobile stations that are registered within the corresponding geographical service area of the SGSN.

Each GGSN 206 is a network element that provides interworking between the GPRS network and external packet switched networks, such as the Internet and X.25 networks. In particular, the GGSN hides the GPRS infrastructure from the external networks. Some functionality of the GGSN includes checking to see if specific mobile stations are active in the radio access network and forwarding data packets to the SGSN that is currently supporting a mobile station. The GGSN also converts GPRS packets coming from an SGSN into the needed packet data protocol format (e.g., Internet Protocol or X.25) and forwards packets to the appropriate external network. The GGSN is also responsible for IP address management/assignment and is the default router for the mobile stations. The GGSN may also implement Authentication, Authorization, and Accounting (AAA) and billing functions.

3GPP networks that include NodeBs, RNCs, SGSNs, and GGSNs are well-known in the field and all of the particular functionality of each functional element is not described in further detail herein.

The MMSC 210 implements message store and forward functionality as is known in MMS messaging systems. In an embodiment, the MMSC also performs message transcoding, implements core messaging technologies (e.g., independent Multipurpose Internet Mail Extensions (MIME) store, Lightweight Directory Access Protocol (LDAP) directory and Simple Mail Transfer Protocol (SMTP)/Mail Transfer Agent (MTA) servers), supports message control functionality (e.g., accept/deny lists and filtering to ignore/reject anonymous messages), and multimedia personal mailbox functionality.

In the MMS message system depicted in FIG. 2, each mobile station 202 is connected by a wireless link to a NodeB 203 (also referred to as a "Base Station"), which communicates through the RNC 204 to the SGSN 205. The SGSN 206 communicates to the GGSN and the GGSN acts as the data gateway. MMS messages from a sender-side mobile station 202 are communicated by the GGSN to the MMSC, which acts as the MSF server. In one embodiment, MMS messages are communicated directly to the MMSC 210 without passing through the Internet gateway and in another embodiment, MMS messages are communicated to the MMSC through the Internet gateway. Further, in some multimedia messaging systems, network elements responsible for tracking the use of messaging services may also be present between the GGSN and the Internet gateway. For example, a billing node may be located between the GGSN and the Internet gateway to support the billing operations of the wireless network service provider.

In an embodiment, each messaging intermediation module 220 is located in a message path between the GGSN 206 and the Internet gateway 208 and intercepts all multimedia messaging traffic that flows through the respective GGSN. The messaging intermediation module controls the forwarding of MMS messages from the GGSN to the Internet gateway, to the MMSC, and to the recipient-side messaging intermediation module. In an embodiment, the messaging intermediation module can forward messages to the Internet gateway, directly to the MMSC, or directly to the recipient-side messaging intermediation module. The ability to control the forwarding of MMS messages enables the messaging intermediation module to optimize the traffic load between various Internet gateways present in the network and to optimize the traffic seen by the MMSC. In an embodiment, the messaging intermediation module can forward an MMS message directly to the recipient-side messaging intermediation module for delivery to the recipient-side mobile station without having the MMS message pass through the MMSC. In this case, the recipient-side messaging intermediation module manages the forwarding of the MMS message through the recipient-side GGSM. In another embodiment, some of the MMS messages may be directed to the MMSC while other MMS messages are forwarded directly to a recipient-side messaging intermediation module without having to pass through an MMSC. Bypassing the MMSC enables some of the messaging workload to be lifted from the MMSC, thereby improving the scalability of the MMS messaging system.

Figure 3:
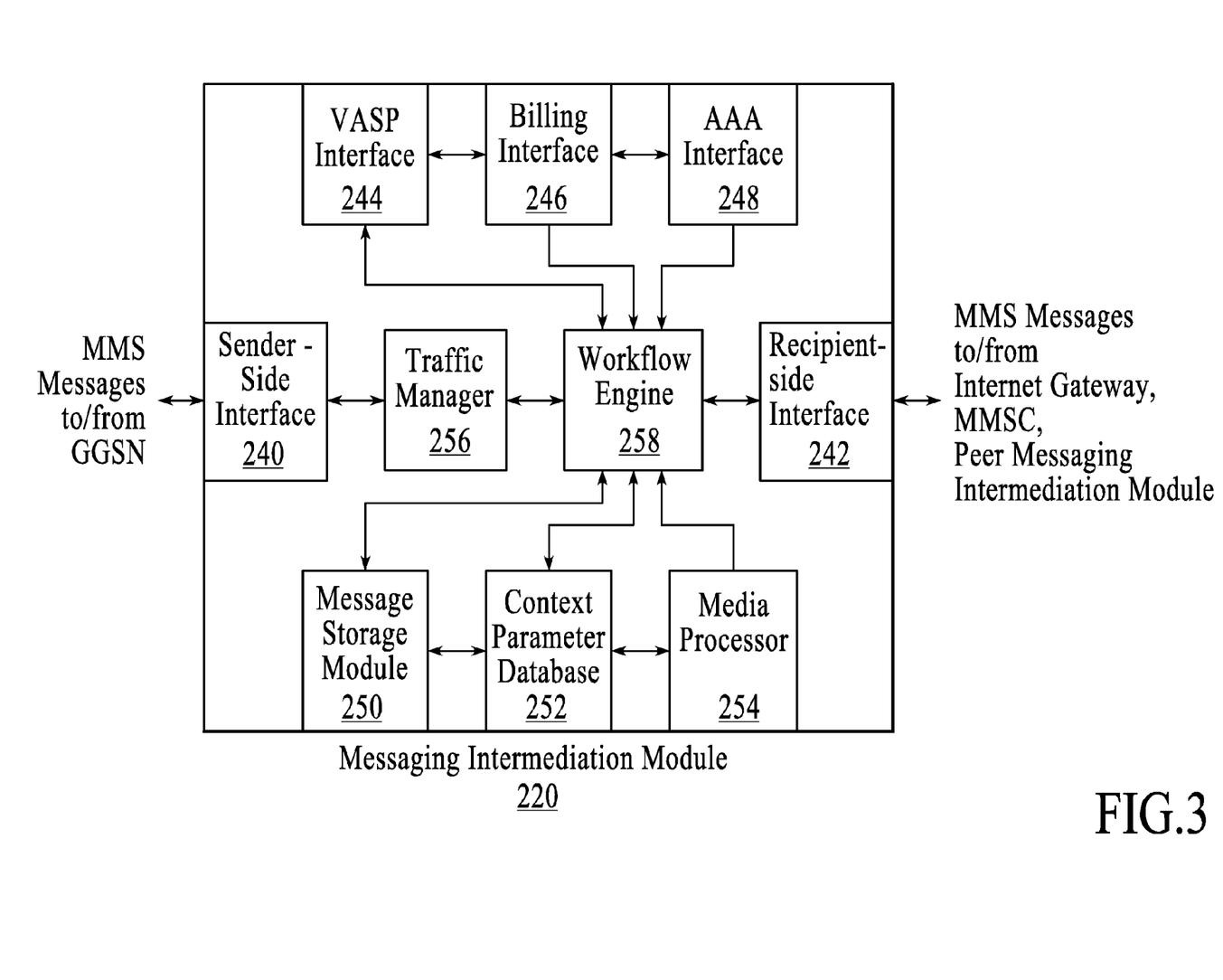
FIG. 3 depicts an embodiment of a messaging intermediation module.

FIG. 3 depicts an embodiment of a messaging intermediation module 220 in accordance with an embodiment of the invention. The messaging intermediation module includes a sender-side interface 240, a recipient-side interface 242, a Value Added Service Provider (VASP) interface 244, a billing interface 246, an AAA interface 248, a message storage module 250, a context parameter database 252, a media processor 254, a traffic manager 256, and a workflow engine 258.

The sender-side interface 240 is an element of the messaging intermediation module 220 that provides an interface to the sender-side functional elements of the messaging system and is the incoming interface for MMS messages that travel from the sender-side mobile station to the recipient-side mobile station. In the embodiment of FIG. 1, the sender-side interface is functionally adjacent to the data gateway and in the embodiment of FIG. 2, the sender-side interface is functionally adjacent to the GGSN. In FIG. 2, the sender-side interface communicates MMS messages between the messaging intermediation module and the GGSN.

The recipient-side interface 242 is an element of the messaging intermediation module 220 that provides an interface to the recipient-side functional elements of the messaging system and is the outgoing interface for MMS messages that are travelling from the sender-side mobile station to the recipient-side mobile station. In the embodiment of FIG. 1, the recipient-side interface is functionally adjacent to the Internet gateway, the MSF server, and the recipient-side messaging intermediation module and in the embodiment of FIG. 2, the recipient-side interface is functionally adjacent to the Internet gateway, the MMSC, and the recipient-side messaging intermediation module. In FIG. 2, the recipient-side interface communicates MMS messages between the messaging intermediation module and the Internet gateway, the MMSC, and the recipient-side messaging intermediation module.

The VASP interface 244 is an interface for value added service providers (e.g., service providers that are distinct from the operator of the multimedia messaging system and wireless communications network). In an embodiment the value added service providers are third-party service providers that provide some additional service, functionality, or data to the MMS system. In an embodiment, the VASP interface enables value added service providers to provide direct inputs to the messaging intermediation module related to, for example, sender parameters, recipient parameters, and optimization parameters.

The billing interface 246 of the messaging intermediation module provides an interface to a billing system or billing systems. In an embodiment, the billing interface enables the MMS system to implement a billing program for the multimedia messaging service.

The AAA interface 248 of the messaging intermediation module provides an interface to authentication, access control, and accounting information and services. In an embodiment, the Internet gateway authenticates the multimedia messaging traffic against a user database. If the sender-side messaging intermediation module forwards an MMS message directly to an MMSC or directly to the recipient-side messaging intermediation module, bypassing the Internet gateway, then the authentication of the messaging traffic needs to be addressed. In an embodiment, the AAA interface of the messaging intermediation module acquires a Remote Authentication Dial In User Service (RADIUS) data feed from a subscriber database of the radio access network, which enables the messaging intermediation module to validate the network privileges of the sender and recipient of the MMS messages. Further, the authentication status of an MMS message may be required by a billing node or the MMSC to which the sender-side messaging intermediation module forwards an MMS message. In an embodiment, the sender-side messaging intermediation module may integrate an authentication token to be used by a billing node or the MMSC.

The message storage module 250 of the messaging intermediation module provides storage for MMS messages. In an embodiment, the message storage module enables the messaging intermediation module to delay communication of MMS messages to other network elements when necessary. Additionally, the message storage module enables the messaging intermediation module to implement an accelerated delivery mechanism by sending MMS messages directly to the recipient-side messaging intermediation modules without passing through the MMSC.

The context parameter database 252 of the messaging intermediation module provides a repository for context parameters that can be used to process MMS messages. In an embodiment, context parameters may include user data, device characteristics, network characteristics, environmental factors, and socio-cultural factors. Examples of user data include the messaging price plan a user is subscribed to (e.g., premium vs. standard), the age of the user, or the billing location of the user. Examples of device characteristics include the screen size and supported audio and video codecs of the mobile station. Examples of network characteristics include network technology (e.g., High Speed Packet Access (HSPA), LTE), network topology (e.g., microwave vs. metro Ethernet backhaul), and available network capacity. Examples of environmental factors include time of day, location of sender and recipient, and weather conditions. Examples of socio-cultural factors include holidays, sporting event schedules, etc. One or more of the context parameters may be combined to form context information that is used to determine how the messaging intermediation module processes a multimedia message. For instance, a multimedia message sent by a user on a standard rate messaging price plan may not get priority treatment for delivery of a multimedia message that is sent from Southern California when the multimedia messaging system is congested due to a wild fire raging in the area.

The media processor 254 of the messaging intermediation module supports the processing of multimedia messages to modify an aspect of the multimedia message. In an embodiment, the media processor transcodes the multimedia content of a MMS message. In an embodiment, video content in an MMS message may be modified by changing the spatial and temporal resolution, changing the encoding bit rate, and/or changing the codec and/or codec parameters. In another embodiment, audio content in an MMS message may be changed by changing the sampling rate, changing the number of channels, changing the encoding bit rate, and/or changing the codec and/or the codec parameters. In another embodiment, image content in an MMS message may be changed by changing the spatial resolution, changing the bit depth, changing the encoding bit rate, and/or changing the codec and/or the codec parameters.

In another embodiment, the media processor 254 processes the content of an MMS message to enhance the message content. For example, the media processor may insert an advertisement in audio, video, image, or textual format into the MMS message. In another embodiment, the media processor may convert textual symbols within an MMS message, such as emoticons, to an equivalent image representation.

The traffic manager 256 of the messaging intermediation module is configured to provide traffic management in the MMS network. In an embodiment, the traffic manager can regulate the flow of MMS message traffic between the functional elements of the MMS system. For example, the when a mobile station initiates a message transfer to or from the messaging intermediation module, the traffic manager can regulate the message transfer rate by delaying or throttling back the transmission of the MMS message. In an embodiment, the traffic manager can delay the transfer of an MMS message by terminating the Transmission Control Protocol (TCP) connection when a mobile station initiates the transfer process. In an embodiment, the traffic manager can throttle back the transfer of an MMS message by delaying the sending of TCP SYN packets from the messaging intermediation module to the mobile station while the MMS message is being transferred. Other types of traffic management can be implemented by the traffic manager.

The workflow engine 258 of the messaging intermediation module is configured to process the multimedia messages and, in response to the processing, to determine where to forward the multimedia messages. In an embodiment, the workflow engine determines whether to forward a multimedia message to the Internet gateway, to forward the multimedia message to the MSF server/MMSC, or to forward the multimedia message to the other messaging intermediation module. In an embodiment, the workflow engine can access resources from any of the traffic manager, the VASP interface, the billing interface, the AAA interface, the message storage module, the context parameter database, and the media processor in order to help make the forwarding decision and any of the criteria described above with respect to the traffic manager, the VASP interface, the billing interface, the AAA interface, the message storage module, the context parameter database, and the media processor can be considered by the workflow engine. Additionally, the workflow engine my dictate how multimedia messages are processed within the messaging intermediation node. For example, the workflow engine may specify a particular type of transcoding for the content of a multimedia message based on the capabilities of the intended recipient-side mobile station.

Figure 4:
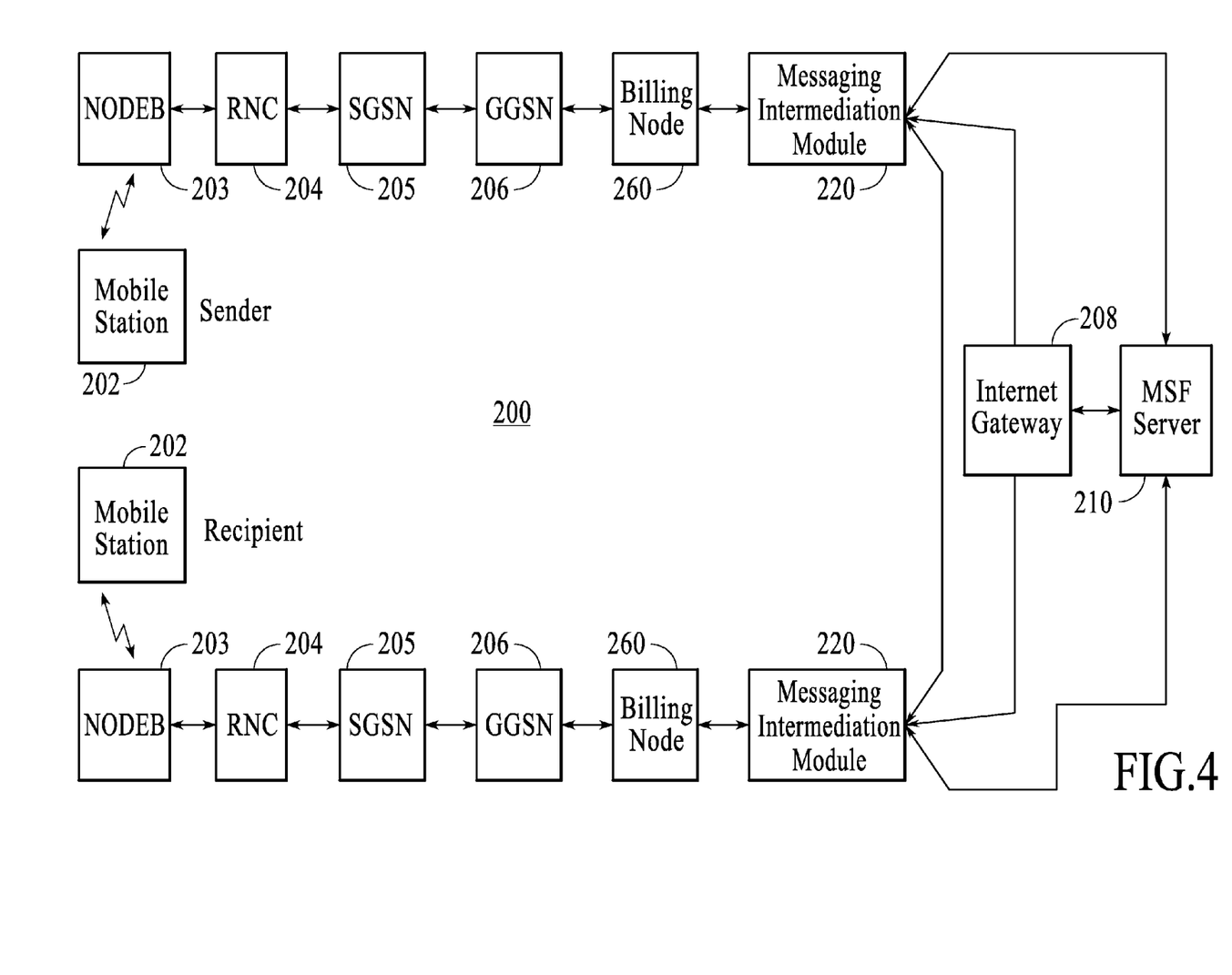
FIG. 4 depicts a network system in which a billing node is located between a Gateway General Packet Radio Service (GPRS) Support Node (GGSN) and a messaging intermediation module.

Although the messaging intermediation modules 220 are described in FIG. 3 with reference to an MMS messaging environment, the messaging intermediation modules 220 can be used in other multimedia messaging environments, such as the multimedia messaging environment described with reference to FIG. 1. In an embodiment, a billing node may be located between the GGSN and the messaging intermediation module. FIG. 4 depicts a network system in which a billing node 260 is located between the GGSN and the messaging intermediation module.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 5:
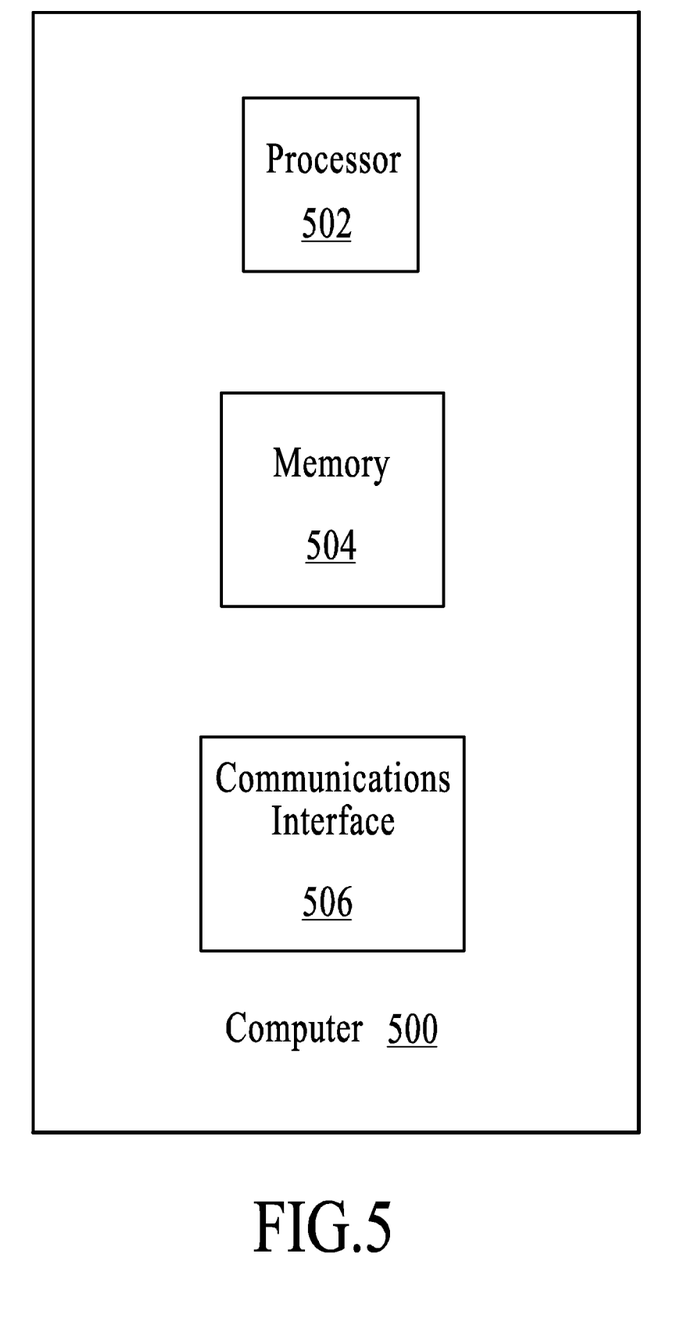
FIG. 5 depicts a computer that includes a processor, memory, and a communications interface.

In an embodiment, the functionality of the message intermediation module 220 of FIG. 3 is performed by a computer that executes computer readable instructions. FIG. 5 depicts a computer 500 that includes a processor 502, memory 504, and a communications interface 506. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for managing multimedia messaging, the system comprising:
    a messaging intermediation module having;
    a sender-side interface configured to communicate a multimedia message between the messaging intermediation module and a data gateway of a multimedia messaging system;
    a recipient-side interface configured to communicate the multimedia message between the messaging intermediation module, an Internet gateway, a message storage store and forward (MSF) server, and another messaging intermediation module;
    a message storage module configured to store the multimedia message for forwarding to the Internet gateway, the MSF server, and the other messaging intermediation module; and
    a workflow engine configured to process the multimedia message and, in response to the processing, to forward the multimedia message to the other messaging intermediation module via the recipient-side interface without passing through the MSF server.

2. The system of claim 1, wherein the messaging intermediation module further comprises a context parameter database, which is accessible by the workflow engine and configured to provide contextual information related to the multimedia message.

3. The system of claim 1, wherein the messaging intermediation module further comprises a media processor, which is accessible by the workflow engine and configured to transcode the contents of the multimedia message.

4. The system of claim 1, wherein the messaging intermediation module further comprises an Authentication, Authorization, and Accounting (AAA) interface, which is accessible by the workflow engine and configured to provide authentication, access control, and/or accounting information to the workflow engine.

5. The system of claim 1, wherein the messaging intermediation module further comprises a Value Added Service Provider (VASP) interface, which is accessible by the workflow engine and configured to provide a service, functionality, or data to the multimedia intermediation module.

6. The system of claim 1, wherein the messaging intermediation module further comprises a billing interface, which is accessible by the workflow engine and configured to provide billing information to the workflow engine.

7. The system of claim 1, wherein the messaging intermediation module further comprises a traffic manager.

8. The system of claim 1, wherein the messaging intermediation module further comprises a context parameter interface, a media processor, an AAA interface, and a traffic manager.

9. A method for managing multimedia messaging, the method comprising:
- receiving a multimedia message at a messaging intermediation module from a data gateway;
- processing the multimedia message at the messaging intermediation module to select where the multimedia message is to be forwarded, wherein the selection is made from an Internet gateway, a message store and forward (MSF) server, or another messaging intermediation module; and
- upon selecting the other messaging intermediation module, forwarding the multimedia message from the messaging intermediation module to the other messaging intermediation module without passing through the MSF server.

10. The method of claim 9, wherein processing the multimedia message comprises storing the multimedia message at the messaging intermediation module.

11. The method of claim 10, wherein the multimedia message is stored at the messaging intermediation module to delay delivery of the multimedia message to a recipient-side mobile station.

12. The method of claim 9, wherein processing the multimedia message comprises transcoding the multimedia message at the messaging intermediation module.

13. The method of claim 9, wherein processing the multimedia message comprises inserting advertising into the multimedia message at the messaging intermediation module.

14. The method of claim 9, wherein processing the multimedia message comprises one of changing the spatial and temporal resolution of video content in the multimedia message, changing the encoding bit rate of video content in the multimedia message, and changing a codec parameter of video content in the multimedia message.

15. The method of claim 9, wherein processing the multimedia message comprises one of changing the sampling rate of audio content in the multimedia message, changing the number of channels of audio content in the multimedia message, changing the encoding bit rate of audio content in the multimedia message, and changing a codec parameter of audio content in the multimedia message.

16. The method of claim 9, wherein processing the multimedia message comprises one of changing the spatial resolution of image content in the multimedia message, changing the encoding bit rate of image content in the multimedia message, and changing a codec parameter of image content in the multimedia message.

17. The method of claim 9, wherein processing the multimedia message comprises regulating the transfer of the multimedia message to a recipient-side mobile station by delaying or throttling back the transfer process.

18. The method of claim 9, wherein processing the multimedia message comprises acquiring information from a subscriber database and validating privileges of a sender and/or a recipient of the multimedia message using the acquired information.

19. The method of claim 9, wherein processing the multimedia message comprises considering a context parameter of the multimedia message.

20. The method of claim 19, wherein the considering a context parameter of the multimedia message comprises considering a messaging plan to which a user is subscribed.

21. The method of claim 9, wherein processing the multimedia message comprises considering one of a characteristic of the recipient-side mobile station, a network characteristic, an environmental factor, and a socio-cultural factor.

22. A system for managing Multimedia Messaging Service (MMS) messages, the system comprising:
- a messaging intermediation module having;
- a sender-side interface configured to communicate an MMS message between the messaging intermediation module and a Gateway GPRS Support Node (GGSN);
- a recipient-side interface configured to communicate the MMS message between the messaging intermediation module and an Internet gateway, a Multimedia Messaging Service Center (MMSC), and another messaging intermediation module;
- a message storage module configured to store the MMS message; and
- a workflow engine configured to process the MMS message and, in response to the processing, to forward the MMS message to the other messaging intermediation module via the recipient-side interface without passing through the MMSC.

23. A system for managing multimedia messaging, the system comprising:
- a data gateway;
- an Internet gateway;
- a message store and forward (MSF) server; and
- a messaging intermediation module located functionally between the data gateway, the Internet gateway, and the MSF server, the messaging intermediation module having;
- a sender-side interface configured to communicate a multimedia message between the messaging intermediation module and the data gateway;
- a multifunction interface configured to communicate the multimedia message between the messaging intermediation module and the Internet gateway, the MSF server, and another messaging intermediation module;
- a message storage module configured to store the multimedia message; and
- a workflow engine configured to process the multimedia messages and, in response to the processing, to forward the multimedia message to the other messaging intermediation module via the multifunction interface without passing through the MSF server.

* * * * *